United States Patent
Baxter et al.

(10) Patent No.: US 10,592,221 B2
(45) Date of Patent: Mar. 17, 2020

(54) PARALLEL DISTRIBUTION OF APPLICATION SERVICES TO VIRTUAL NODES

(71) Applicant: HEWLETT PACKARD ENTERPRISE DEVELOPMENT LP, Houston, TX (US)

(72) Inventors: Joel Baxter, San Carlos, CA (US); Krishna C. Sagiraju, San Jose, CA (US); Shreyas Subramanya, San Jose, CA (US)

(73) Assignee: HEWLETT PACKARD ENTERPRESE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/145,574

(22) Filed: May 3, 2016

(65) Prior Publication Data

US 2017/0322788 A1  Nov. 9, 2017

(51) Int. Cl.
*G06F 8/60* (2018.01)
*H04L 29/12* (2006.01)
*G06F 9/445* (2018.01)
*G06F 9/54* (2006.01)

(52) U.S. Cl.
CPC .............. *G06F 8/60* (2013.01); *G06F 9/445* (2013.01); *G06F 9/542* (2013.01); *H04L 61/103* (2013.01); *H04L 61/6022* (2013.01); *G06F 2209/503* (2013.01)

(58) Field of Classification Search
CPC ....... G06F 8/60; H04L 61/15; H04L 61/2015; H04L 61/6022
See application file for complete search history.

(56) References Cited

U.S. PATENT DOCUMENTS

| | | | | |
|---|---|---|---|---|
| 2008/0250405 | A1* | 10/2008 | Farhangi | G06F 8/61 717/177 |
| 2013/0061220 | A1* | 3/2013 | Gnanasambandam | G06F 9/45558 718/1 |
| 2014/0297734 | A1* | 10/2014 | Lacapra | H04L 67/1097 709/203 |
| 2015/0254096 | A1* | 9/2015 | Dunning | G06F 9/45558 718/1 |
| 2015/0378702 | A1* | 12/2015 | Govindaraju | G06F 8/61 717/177 |
| 2016/0105392 | A1* | 4/2016 | Thakkar | H04L 61/2038 709/220 |

* cited by examiner

*Primary Examiner* — Wei Y Zhen
*Assistant Examiner* — Amir Soltanzadeh
(74) *Attorney, Agent, or Firm* — Hewlett Packard Enterprise Patent Department (57) ABSTRACT

Systems, methods, and software described herein provide enhancements for initiating application services across a virtual environment. In one implementation, a method of deploying application services includes initiating configuration process for a first service and a second service across virtual nodes, wherein the first service is dependent on the availability of the second service. The method further includes holding the configuration of the first service, completing the configuration of the second service, and responsively transferring a notification from the virtual node or nodes of the second service to the virtual node or nodes of the first service, permitting the configuration of the first service to be completed.

20 Claims, 7 Drawing Sheets

PARALLEL DISTRIBUTION OF APPLICATION SERVICES TO VIRTUAL NODES

TECHNICAL FIELD

Aspects of the disclosure are related to computing software deployment, and in particular to deploying dependent application services.

TECHNICAL BACKGROUND

Virtualization techniques have gained popularity and are now commonplace in data centers and other computing environments in which it is useful to increase the efficiency with which computing resources are used. In a virtualized environment, one or more virtual nodes are instantiated on an underlying host computer and share the resources of the underlying computer. Accordingly, rather than implementing a single node per host computing system, multiple nodes may be deployed on a host to more efficiently use the processing resources of the computing system. These virtual nodes may include full operating system virtual machines, Linux containers, such as Docker containers, jails, or other similar types of virtual containment nodes.

At the same time, application services have been generated that execute on one or more virtual nodes to provide a desired operation within a virtual environment. These application services often require or are dependent upon other application services that are executing in the same environment using one or more virtual nodes. For example, a first application service on a first virtual node may be dependent on a second application service executing on a second virtual node. However, deploying the application services can be difficult and cumbersome, as a proper order of operations may be required to properly implement multiple dependent application services within a virtual environment.

OVERVIEW

The technology disclosed herein enhances the parallel distribution and initiation of application processes within a computing environment. In one implementation, a method of operating a computing environment to deploy application services across virtual nodes includes initiating configuration processes on the virtual nodes to configure at least a first service on a first set of the virtual nodes and a second service on the second set of the virtual nodes, wherein the first service is dependent on availability of the second service. The method further provides, in the first set of the virtual nodes, holding a configuration process for the first service to prevent execution of the first service until an availability notification is identified for the second service. The method also includes, in the second set of the virtual nodes, identifying when the second service is running on the second set of virtual nodes and communicating the availability notification to at least one virtual agent for the first set of the virtual nodes. The method further provides, in the first set of virtual nodes, identifying the availability notification in the virtual agent and, in response to identifying the availability notification, executing the configuration process for the first service to run the first service on the first set of the virtual nodes.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Virtualization techniques have gained popularity and are now commonplace in data centers and other computing environments in which it is useful to increase the efficiency with which computing resources are used. In a virtualized environment, one or more virtual nodes are instantiated on an underlying host computer and share the resources of the underlying computer. Accordingly, rather than implementing a single node per host computing system, multiple nodes may be deployed on a host to more efficiently use the processing resources of the computing system. These virtual nodes may include full operating system virtual machines, Linux containers, such as Docker containers, jails, or other similar types of virtual containment nodes.

Within the virtual nodes of a computing environment, administrators and users of the environment may deploy various application services that provide a desired operation. These services may operate on a single node, in some implementations, but may also execute as a distributed operation that runs on a plurality of virtual nodes within the computing environment. In some implementations, application services may also be dependent upon other services executing in the environment. For example, a first application service may require a second application to be executing in a computing environment before the first application service can provide the desired operation. This may be the case if the first application service monitors the operations of the second application service, the first application service generates a visualization of the operations of the second application service, or any other similar dependency.

Here, to deploy multiple application services within a computing environment, management nodes, configuration processes, and virtual agents manage the initiation of the application services to ensure that services are initiated in a desired order. Thus, if a user or administrator requests a first application service that depends on a second application service, the management node may deploy configuration processes in parallel to one or more virtual nodes to configure the first application service and the second application service. Once initiated by the management node, the configuration processes, in conjunction with virtual agents that execute on each of the virtual nodes, ensure that the second application service is running in the computing environment before permitting the first application service to execute in the computing environment. This limiting the execution of the first application service may be accomplished by holding the configuration process for the first application service, while waiting for a confirmation from the virtual agents on the virtual nodes to notify the configuration process that the second application service is running in the environment. Once running, the held configuration process for the first application service may continue the configuration operation.

Figure 1:
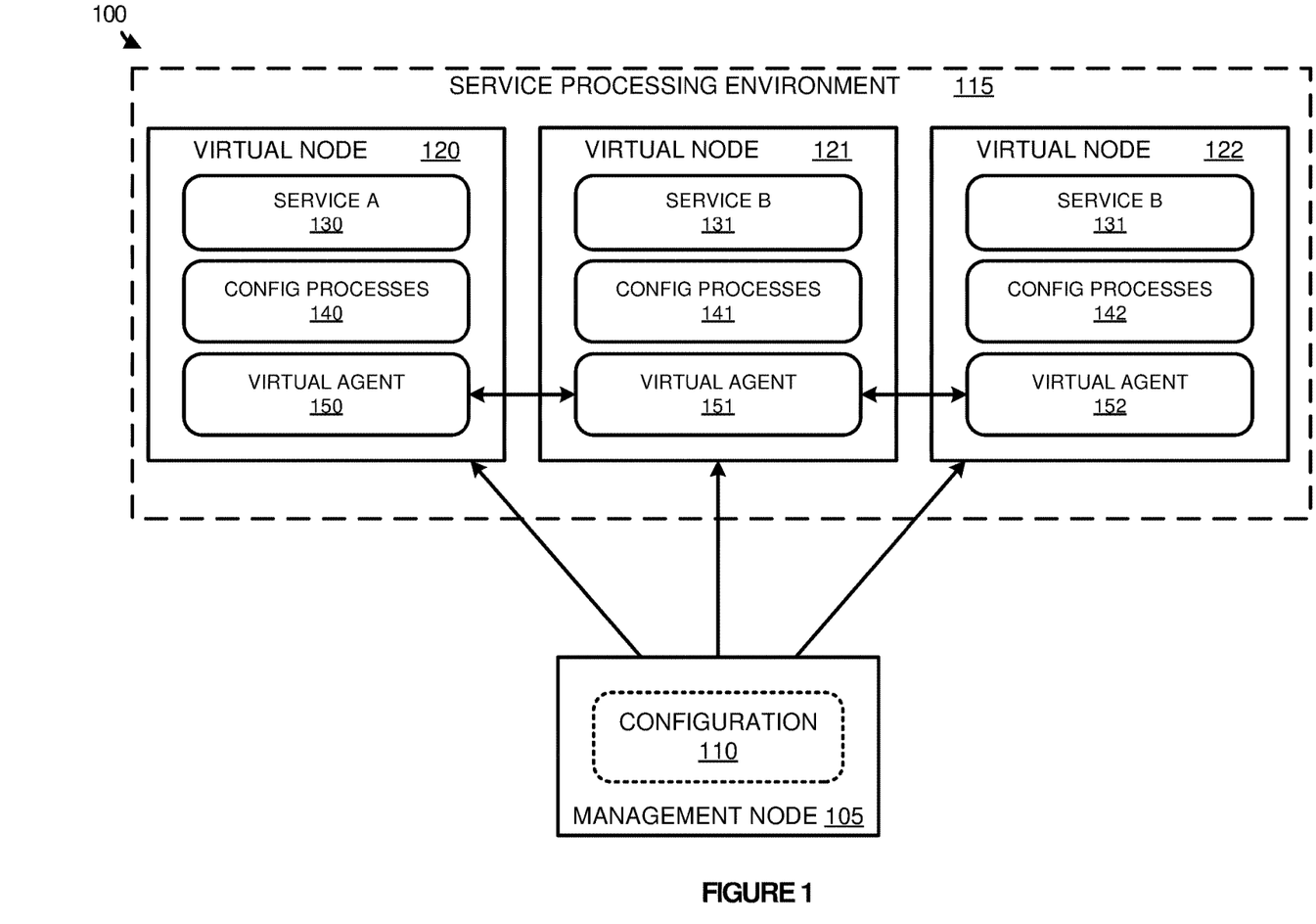
FIG. 1 illustrates a computing environment to distribute application services to virtual nodes according to one implementation.

To further demonstrate deploying dependent application service within a computing environment, FIG. 1 is provided. FIG. 1 illustrates a computing environment 100 to distribute application services to virtual nodes according to one implementation. Computing environment 100 includes management node 105 and service processing environment 115, which may operate on one or more physical host computing systems, wherein the physical host computing systems may comprise one or more server computers, desktop computers, or some other combination of computing devices. Service processing environment 115 includes virtual nodes 120-122, which include services 130-131, configuration processes 140-142, and virtual agents 150-152.

In operation, computing environment 100 may be deployed to provide computing resources to various application services. These application services may include large-scale processing framework (LSPF) application services, such as Hadoop, Gluster, Splunk, or any other similar LSPF application service, or may comprise other application services that are dependent on one another in a computing environment. Here, management node 105 deploys configuration 110 to virtual nodes 120-122, wherein the configuration indicates a request to initiate services 130-131 in service processing environment 115. In response to the request, management node 105 may allocate the services to virtual nodes 120-122, and initiate configuration processes 140-142.

Once the configuration processes are initiated in service processing environment 115, service A 130 and service B 131 may be initiated based on dependencies identified for the services. For example, service A 130 may be dependent on service B 131 executing within service processing environment 115. Consequently, configuration processes 140 may hold the configuration and start of service A 130 until service B 131 is operational in processing environment 115. In some implementations to determine when services become operational within the environment, configuration processes 140-142 may report the status of the services within the environment to virtual agents 150-152. Virtual agents 150-152 may then communicate the status information to other virtual agents in the environment, permitting other configuration processes to determine when the configuration of an application service is completed.

In some implementations, the services and/or the configuration processes may communicate and monitor the operations of the other services using an arbitrary namespace that operates without knowledge of which node other services are executing on. This namespace is then translated using virtual agents 150-152 to provide the necessary communications. For example, to communicate to configuration processes 141-142 that service A is operational in service processing environment 115, configuration processes 140 may notify virtual agent 150 that the configuration of service A 130 is complete and that a notification should be sent to configuration processes 141-142 associated with service B 131. Virtual agent 150 will identify the request that uses an arbitrary namespace for configuration processes 141-142, such as TENANT_ALPHA/SERVICE_B_CONFIG, and translate the request into the appropriate addressing information for service B nodes. This addressing information may comprise internet protocol (IP) addresses, media access control addresses (MAC addresses), or any other similar addressing for the nodes associated with service B 131. Once translated, virtual agent 150 may transfer an indication that service A 130 is operational to virtual nodes 121-122 and virtual agents 151-152. Virtual agents 151-152 may then supply the notification to configuration process 141-142

Figure 2:
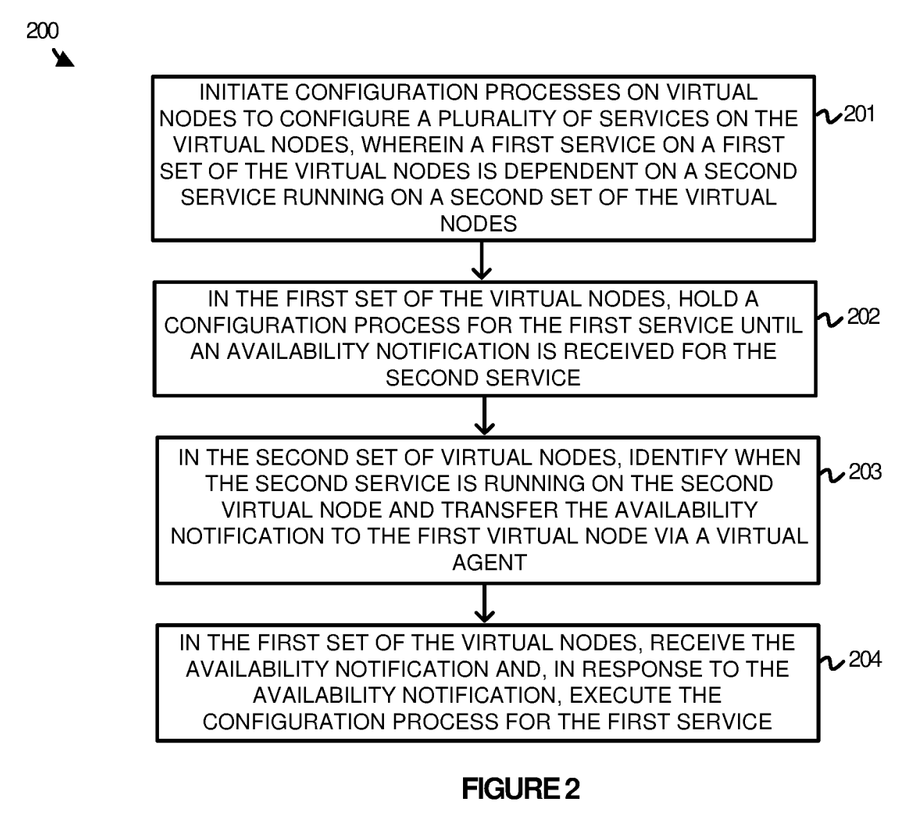
FIG. 2 illustrates a method of operating a computing environment to distribute application services to virtual nodes according to one implementation.

To further demonstrate the operations of computing environment 100, FIG. 2 is provided. FIG. 2 illustrates a method 200 of operating computing environment 100 to distribute application services to virtual nodes according to one implementation. The operations of FIG. 2 are referenced parenthetically in the paragraphs that follow, along with references to the elements and systems from computing environment 100 of FIG. 1. In particular, references are made to service A 130 depending on the execution of service B 131.

As illustrated in FIG. 2, method 200 begins by initiating configuration processes on virtual nodes to configure at least a first service on a first set of the virtual nodes and a second service on a second set of the virtual nodes, wherein the first service is dependent on the availability of the second service (201). Referring to computing environment 100, an administrator or a user associated with service processing environment 115 may desire to implement a new operation that requires multiple application services. For example, a user may desire to generate a Hadoop cluster that is monitored using a Splunk service. However, because Splunk is used to monitor the operations of the Hadoop cluster, the Splunk service may have to wait for the Hadoop cluster to become operational before the Splunk service executes. Once the user selection of the services is identified for the environment, management node 105 may identify the required virtual nodes and initiate the configuration processes 140-142 to make the selected processes operational. In particular, referring to service processing environment 115, virtual node 120 is allocated configuration processes 140 for service A 130 which is dependent on service B 131, while virtual nodes 121-122 are provided with configuration processes 141-142 to generate service B 131.

Once the configuration processes are initiated in the computing environment, method 200 further provides, in the first set of the virtual nodes, holding a configuration process for the first service to prevent execution of the first service until an availability notification is received for the second service (202). In particular, because service A 130 is dependent on service B 131 being operational in the computing environment, configuration processes 140 may be paused or held until a notification is identified for service B 131. While the configuration of the first service is halted in the first set of the virtual nodes, method 200 further provides, in the second set of the virtual nodes, identifying when the second service is running on the second set of the virtual nodes and communicating an availability notification to at least one virtual agent for the first set of virtual nodes (203). Once the notification is received by the first set of virtual nodes, the first set of virtual nodes, in response to the notification, execute the configuration processes for the first service to make the first service run on the first set of virtual nodes (204).

Referring again to computing environment 100, while configuration processes 140 are held, configuration processes 141-142 for service B 131 may complete the configuration operations, and report to virtual agent 150 that service B is operational in service processing environment 115. To report that service B is operational, configuration processes 141-142 may identify that the configuration processes are complete and notify virtual agents 151-152 of the completion. Once notified, virtual agents 151-152 may forward a notification to virtual agent 150 indicating that service B 131 is operational within computing environment 100.

In some implementations, to transfer the configuration between virtual nodes, a virtual agent in virtual agents 151-152 may be configured to receive a notification of a completion from one of configuration processes 141-142, wherein the notification uses a namespace associated with the tenant that generated the service. Once the notification in the namespace is received from a configuration process, the virtual agent may translate the notification into an address associated with any dependent process. For example, virtual agent 151 may receive a notification from configuration process 141 using an arbitrary namespace associated with configuration 110, which may be based on a name for the cluster of services, a name for the user that generated the cluster, the name of the group or tenant that generated the cluster of services, or any other similar namespace. Once received, virtual agent 151 may translate the namespace into the required address for the associated service, in this implementation, virtual node 120 for configuration processes 140.

Figure 3A:
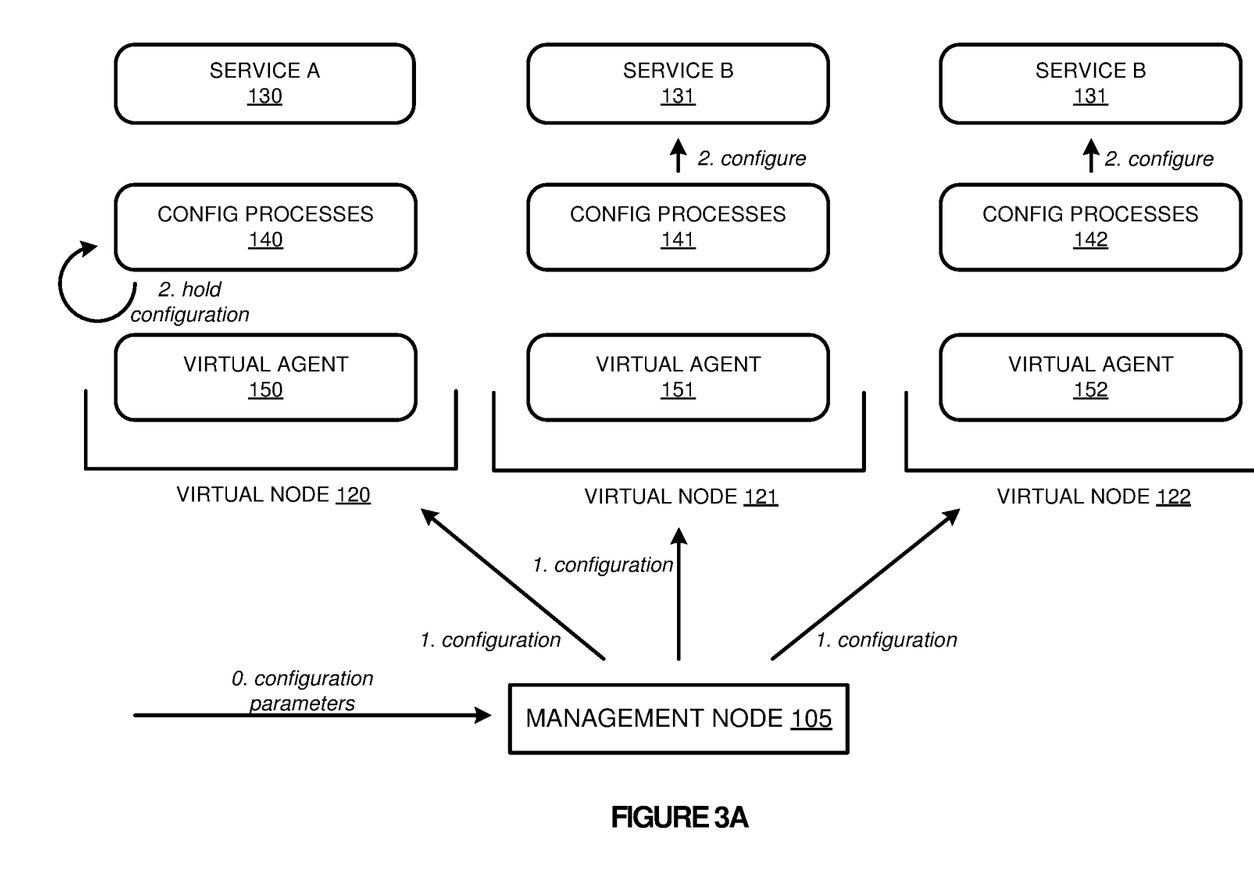
FIG. 3A illustrates an operational scenario of operating a computing environment to distribute application services to virtual nodes according to one implementation.
Figure 3B:
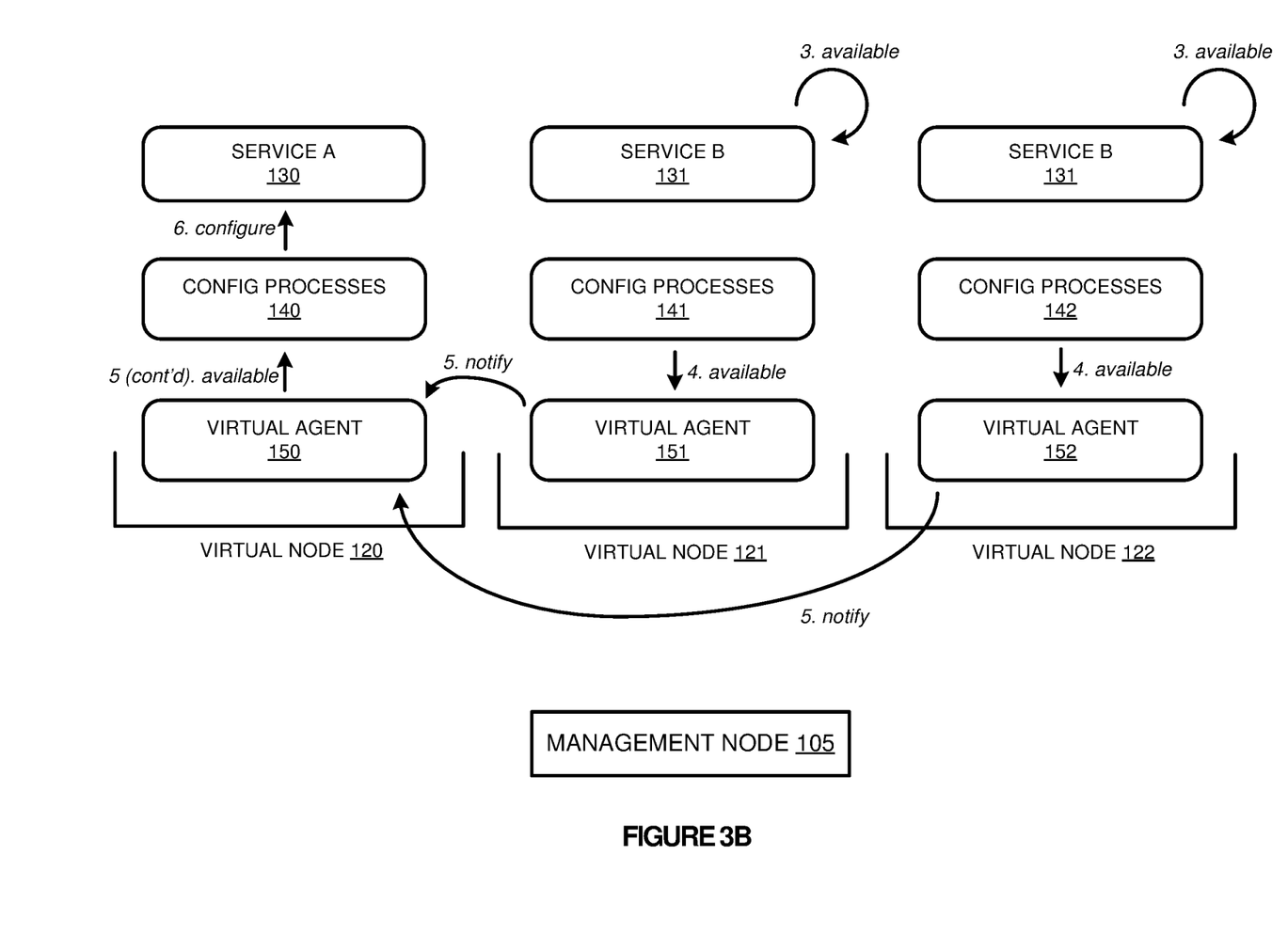
FIG. 3B illustrates an operational scenario of operating a computing environment to distribute application services to virtual nodes according to one implementation.

FIGS. 3A and 3B illustrate operational scenarios of operating a computing environment to distribute application services to virtual nodes according to one implementation. FIGS. 3A and 3B include the systems and elements of computing environment 100.

Referring first to FIG. 3A, in operation, management node 105 obtains, at step 0, configuration parameters from a user or administrator of computing environment 100 to generate a clustered operation across multiple virtual nodes. These configuration parameters may include processing resource parameters, memory resource parameters, storage parameters, a quantity of virtual nodes, or any other similar processing resource parameter. Further, the user or administrator may define application services that should operate across the virtual nodes, wherein at least one of the services is dependent on a second service initiated for the cluster. Once the parameters are defined, management node 105, at step 1, initiates the configuration of the services on virtual nodes 120-122. Referring to the example in FIG. 3A, service A 130 is dependent on service B 131 being operational in the environment. Consequently, configuration processes 140 are halted or held, at step 2, for service A 130 to prevent service A 130 from becoming operational before service B 131, while configuration processes 141-142 are continued for service B 131 on virtual nodes 121-122.

In some implementations, to determine the dependencies for the selected application services, management node 105 and/or configuration processes 140-142 may maintain one or more data structures to ensure processes are started in a certain order. For example, when the user selects service A 130 and service B 131 for the cluster, management node 105 and/or configuration processes 140 may identify that service B 131 must be running in a cluster before service A 130 can run in the same cluster. Thus, prior to completing the initiation of service A 130, the configuration processes associated with the service may be stopped until a notification is received for service B 131.

Turning now to FIG. 3B, at step 3, the configuration of service B 131 is completed on virtual nodes 121-122, and a notification is communicated, at step 4, from configuration processes 141 and configuration processes 142 to virtual agent 151 and virtual agent 152 to indicate that the services are running and available in the cluster. In some implementations, the notification transferred between configuration processes 141-142 and virtual agents 151-152 may include a namespace identifier for any dependent process, such that virtual agents 151-152 may notify other virtual agents and configuration processes of the completed configuration for service B 131. For example, configuration processes 141 on virtual node 121 may communicate a completion notification for service B 131 to TENANT_ALPHA/SERVICE_A_CONFIG to indicate that service B 131 is available in the computing environment.

In response to receiving the availability notification from the configuration processes, virtual agents 151-152 translate the request using the namespace associated with cluster into a destination address or addresses for the dependent services. Here, the destination would be virtual agent 150, which may be addressed using an IP address, a network name, a MAC address, or some other naming scheme, including combinations thereof. Once the addressing information is determined for the dependent processes, the virtual agents, at step 5, notify virtual agent 150 that service B 131 is available in the computing environment and virtual agent forwards the availability notification to the appropriate configuration processes on virtual node 120. Once received from virtual agent 150, configuration process 140 may configure the remaining portions of service A 130, permitting service A 130 to execute on virtual node.

In some implementations, configuration process 140 may, at defined intervals, query virtual agent 150 to determine if any availability notifications have been received for services on which service A 130 depends. In other implementations, virtual agent 150 may forward, without inquiry by configuration processes 140, an availability notification to the configuration processes, permitting the configuration processes to complete the configuration of service A 130.

Figure 4:
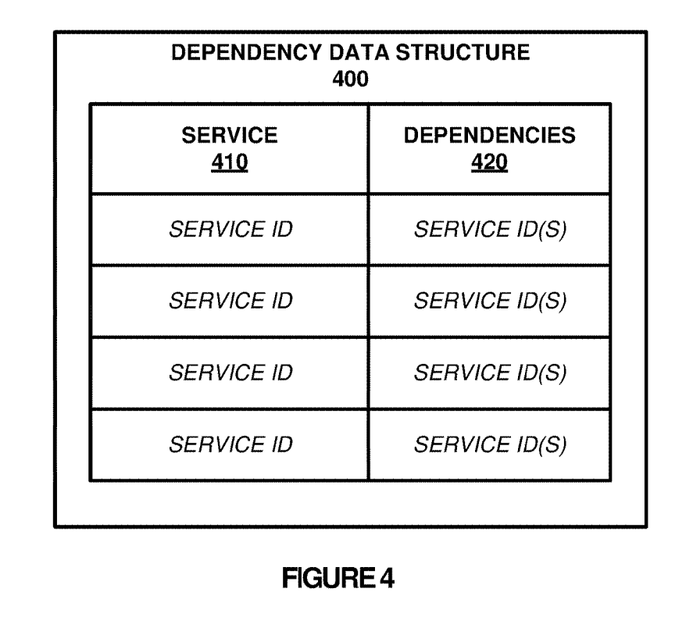
FIG. 4 illustrates a dependency data structure to identify dependencies between application services according to one implementation.

FIG. 4 illustrates a dependency data structure 400 to identify dependencies between application services according to one implementation. Dependency data structure 400 includes service column 410 and dependencies column 420. Although illustrated as a table in the present implementation, it should be understood that dependency information may be maintained in a linked list, an array, a data tree, or any other similar data structure including combinations thereof.

As described herein, when a request for a new cluster of application services is requested across multiple virtual nodes, the application services may require that at least one of the application services be initiated after at least one other application service. For example, Splunk may require that Hadoop services be initiated and running on virtual nodes prior to the Splunk service being initiated on one or more nodes. Rather than requiring the user or administrator generating the new cluster with the application services to monitor the dependencies, the computing environment in which the cluster is being generated may maintain at least one data structure to identify these dependencies. In at least one implementation, the user or administrator may be provided with various selections of services that can be provided together as a cluster. The user or administrator may then select the desired application services from the list, and request that the services be generated within a computing environment across multiple virtual nodes. Instead of identifying which of the services must be running at what time during the deployment of the application services, the data structure may provide dependency requirements for each of the services ensuring that they are initiated in the appropriate order.

In the particular example of dependency data structure 400, service column 410 and dependencies column 420 may be searched to identify dependent services that are being implemented together. Referring to the examples of FIGS. 3A and 3B, configuration processes 140 may use a data structure similar to dependency data structure 400 to determine the dependencies of service A 130. In some implementations, the management node may search data structure 400 and provide the required dependencies to each of the configurations processes. In other implementations, the configuration processes on the individual virtual nodes may search data structure 400 to determine dependencies of the deployed services.

Figure 5:
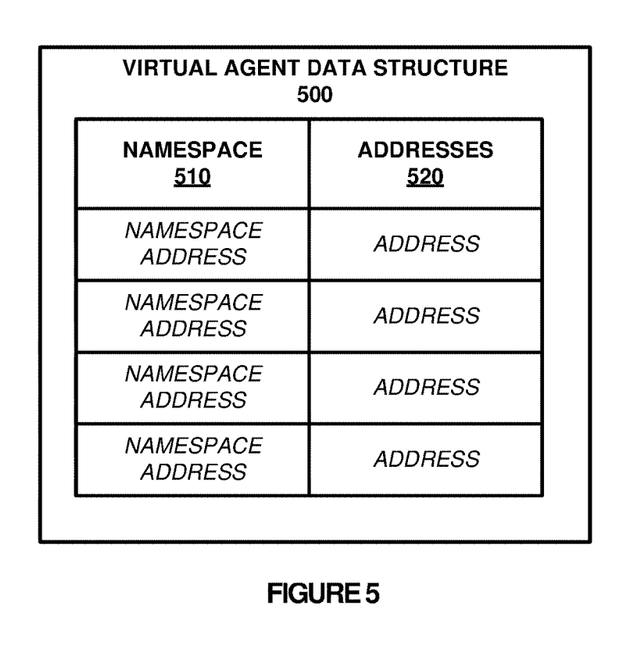
FIG. 5 illustrates a virtual agent data structure to manage addressing information for dependent application services according to implementation.

FIG. 5 illustrates a virtual agent data structure 500 to manage addressing information for dependent application services according to implementation. Virtual agent data structure 500 includes namespace column 510 and IP addresses 520. Virtual agent data structure 500 is representative of a data structure that can be used by virtual agents in determining addressing information for the individual services of a processing cluster. Although illustrated as a table in the present implementation, it should be understood that the virtual agents may use one or more data trees, arrays, linked lists, or any other similar data structures, including combinations thereof.

As described herein, once an administrator or user define a cluster to be implemented using multiple application services, a management node for a service processing environment may initiate configuration processes across the various nodes of the cluster to implement the desired application services. These configuration processes initiate the running of the services within the environment, and also ensure that each of the services is initiated at the appropriate time based on dependencies with other services within the same cluster. Accordingly, while a first application is configured using the configuration processes and initiates its operation, a second application's configuration may be held until the configuration of the first application is complete. This enables multiple application services to be deployed in parallel without the monitoring of a user or an administrator through each step of the configuration process.

To communicate between the application services and the configuration processes associated therewith, virtual agents may be deployed in the virtual nodes of the cluster that manage the communications between the nodes and the application services. In particular, when a cluster is generated with multiple application services, the cluster and the associated services may be provided with a namespace specific to the tenant, the user that generated the cluster, the type of cluster, or any other similar namespace capable of identifying services that belong to the cluster. For example, a cluster for "Tenant X" with service A and service B may be provided with a namespace identifier of Tenant_X that can be used in conjunction with identifiers for the individual services. Thus, to address service A, a namespace address may include Tenant_X/service_A, and to address service B, a namespace address may include Tenant_X/service_B. These namespaces permit clusters of application services to address one another across multiple nodes without using IP addresses or MAC addresses allocated to the particular service.

In particular, when a service or a configuration process requires a communication with another service or communication process, the communication is transferred to the virtual agent using the namespace address for the destination service or configuration process. Once received by the virtual agent, the virtual agent will use virtual agent data structure 500 to translate the request into the appropriate address by matching the namespace address provided in namespace 510 to a second address in addresses 520. This second address may comprise a MAC address, an IP address, or some other address associated with the destination. Once translated, the communication will be forwarded to the appropriate node or nodes, where a virtual agent at the receiving nodes may translate the second address into the namespace address for the service and provide the required communication to the recipient service.

Figure 6:
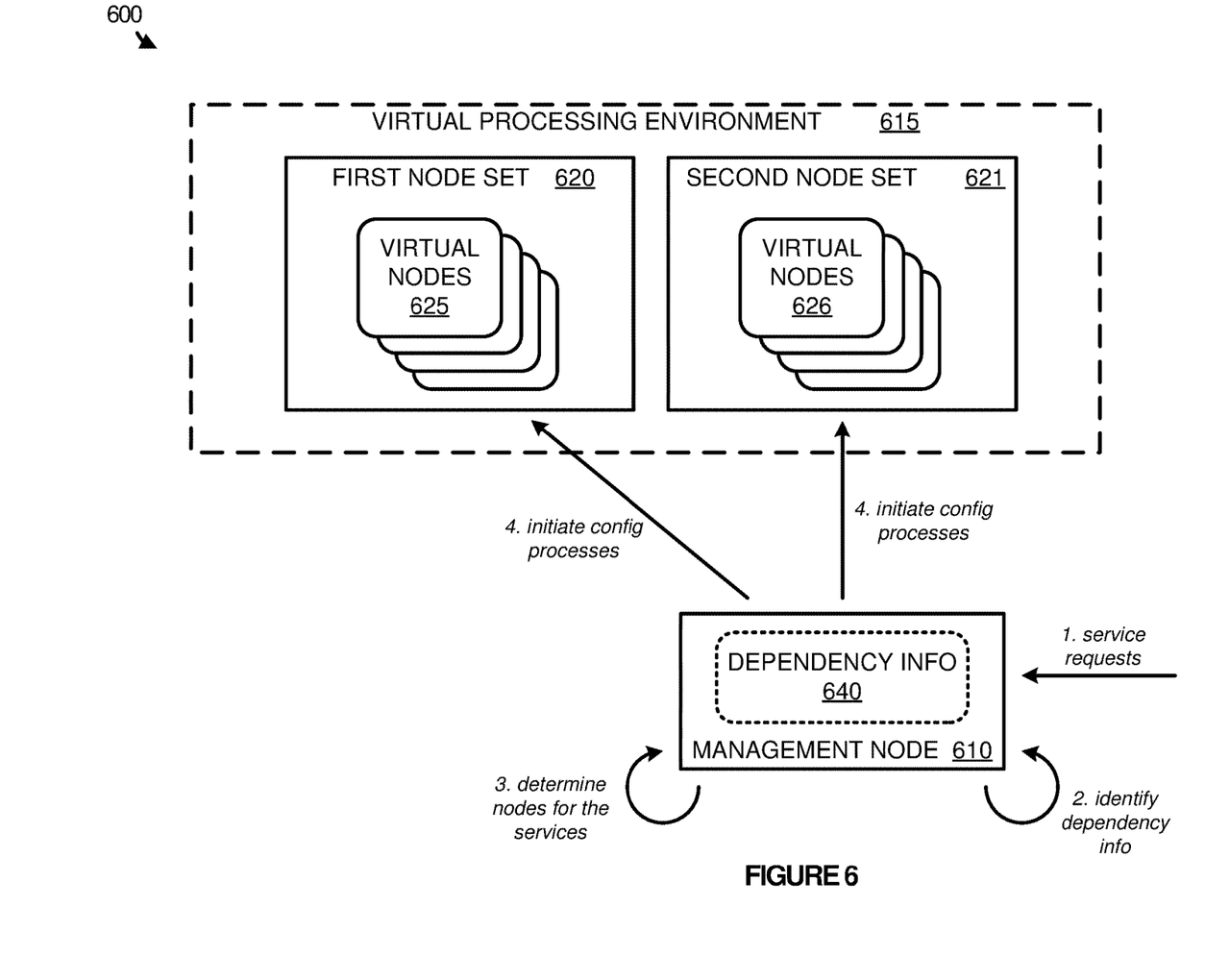
FIG. 6 illustrates an operational scenario of initiating application services on virtual nodes according to one implementation.

FIG. 6 illustrates an operational scenario 600 of initiating application services on virtual nodes according to one implementation. Operational scenario 600 includes management node 610 and virtual processing environment 615. Virtual processing environment 615 further includes first node set 620 and second node set 621 with virtual nodes 625-626. Management node 610 and virtual nodes 625-626 may be implemented on one or more physical host computing systems. Although illustrated with two node sets in the present implementation, it should be understood that any number of virtual node sets may be deployed to provide the cluster functionality desired by a creating user.

In operation, at step 1, management node 610 receives application service requests from an end user to generate a cluster of virtual nodes, wherein the virtual nodes execute at least one application service that is dependent on another application service in the same cluster. Once a request is identified for the cluster, management node 610 identifies, at steps 2 and 3, virtual nodes capable of providing the desired operations, and further identifies dependency information for the various application services required for the cluster.

In some implementations, the administrator or user generating the cluster with the application services may define resources for each of the application services. These resources may include a number of virtual nodes, processing cores, amount of memory, amount of storage, or any other similar resources dedicated to each of the application services. In other implementations, based on the defined application services by the administrator or end user, management node 610 may define a default amount of resources that are required for each of the application services. Once the resources are identified for the application services, management node 610 may identify idle virtual nodes, or generate new virtual nodes to support the required application services.

Further, in addition to identifying the virtual nodes for the new cluster, management node 610 identifies dependency information for the required application services. In some implementations, management node 610 may include dependency information 640 that comprises one or more data structures capable of identifying application services and any related dependent application services. For example, if the administrator or end user required a cluster with a Hadoop framework cluster and a Splunk application to monitor the Hadoop framework cluster, dependency information 640 may be used to identify that Splunk is dependent on the Hadoop framework cluster being operational within virtual processing environment 615.

Once the nodes are identified for the cluster and the dependencies are identified for the application services, management node 610 initiates, at step 4, the configuration processes on the virtual nodes to make the services on the nodes operational. In the present implementation, management node 610 identifies that two sets of virtual nodes are required to provide the desired operation in virtual processing environment 615, wherein the sets include first node set 620 with virtual nodes 625, and second node set 621 with virtual nodes 626. To configure the required sets of virtual nodes, management node 610 may initiate configuration processes on virtual nodes 625-626, permitting the nodes to configure the required application services on each of the nodes. Further, management node 610 may provide the configuration processes on each of the virtual nodes with information regarding the dependencies for each of the services, and namespace information permitting the services and configuration processes to communicate with one another without identifying the virtual node or nodes for the destination service or configuration process.

To support the namespace usage by the configuration processes and services of the created cluster, virtual agents located on each of the virtual nodes may be provided that translate communication requests using the namespace communication scheme into the required addressing format for the communication. For example, if a first configuration process in virtual nodes 625 required a communication to be transferred to a second configuration process in virtual nodes 626, the communication may be transferred from the first configuration process to a local virtual agent using a namespace address for the second configuration process. The namespace address may then be translated by the local virtual agent, and transferred to one or more nodes providing a platform for the second configuration process. Once transferred to the nodes for the second configuration process, virtual agents on the nodes may provide the communication to the second configuration process.

Figure 7:
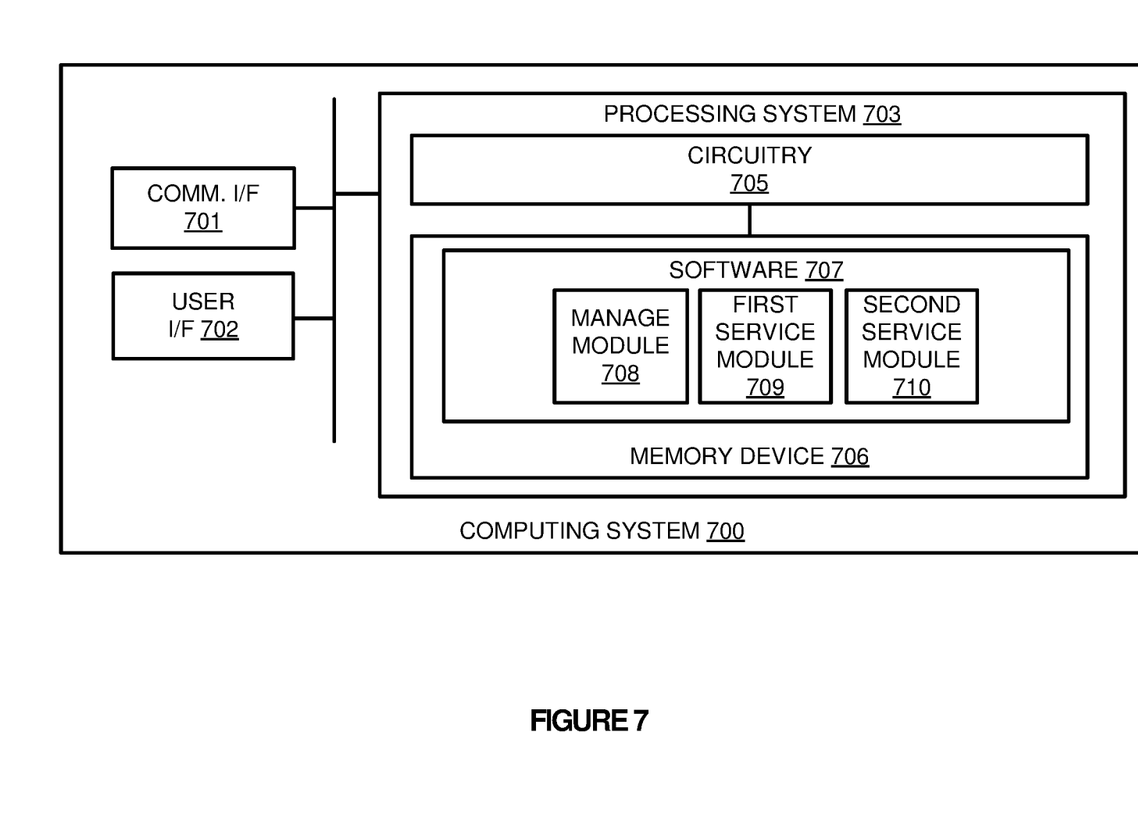
FIG. 7 illustrates a computing system to distribute application services to virtual nodes according to one implementation.

FIG. 7 illustrates a computing system 700 to distribute application services to virtual nodes according to one implementation. Computing system 700 is representative of any computing system or systems with which the various operational architectures, processes, scenarios, and sequences disclosed herein for a computing environment with dependent application services and virtual nodes. Computing system 700 is an example of computing system 100 of FIG. 1, although other examples may exist. Computing system 700 comprises communication interface 701, user interface 702, and processing system 703. Processing system 703 is linked to communication interface 701 and user interface 702. Processing system 703 includes processing circuitry 705 and memory device 706 that stores operating software 707. Computing system 700 may include other well-known components such as a battery and enclosure that are not shown for clarity. Computing system 700 may comprise one or more server computing systems, desktop computing systems, laptop computing systems, or any other computing system, including combinations thereof.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes manage module 708, first service module 709, and second service module 710, although any number of software modules may provide the same operation. Manage module 708 is representative of a management node capable of generating clusters with dependent application services, represented in computing system 700 by first service module 709 and second service module 710. Operating software 707 may further include an operating system or systems, utilities, drivers, network interfaces, applications, or some other type of software. When executed by processing circuitry 705, operating software 707 directs processing system 703 to operate computing system 700 as described herein.

In particular, manage module 708 directs processing system 703 to receive a request for a new cluster of application services, wherein the application services include at least a first service that is dependent on a second service for operation. Once the application services are defined for the cluster, management module 708 directs processing system 703 to identify virtual nodes for each of the services, and initiate configuration processes for the services on the virtual nodes. Here, management module 708 initiates first service module 709 and second service module 710, which are each representative of sets of one or more virtual nodes capable of providing a platform for the requested application services. In some implementations, in initiating the configuration processes on the virtual nodes, manage module 708 may identify and notify the configuration processes on the virtual nodes of the dependencies between application services being implemented in the requested cluster.

Once manage module 708 initiates the configuration processes for the first service and the second service, the configuration processes on first service module 709 are halted prior to initiating the first service to permit the second service to complete its initialization. Once the second service completes the initialization and is running on computing system 700, a notification is transferred from the second service node or nodes to the first service node or nodes permitting the configuration processes for the first service to complete operations and make the first service available on computing system 700.

In some implementations, the virtual nodes for the first service and the second service may include virtual agents that can be used in the communication between nodes. In particular, these virtual agents may be used to translate addressing for communications between the configuration operations and the services. For example, an arbitrary namespace may be used to communicate between the configuration operations and the services. By employing the virtual agents, the configuration operations and the services may use a first addressing scheme or namespace that operates without knowledge of which node other services are executing on. Once a communication is identified between services in the cluster, a virtual agent may translate the namespace into the required IP or MAC address associated with the destination service. The communication may then be forwarded to the appropriate node of the destination service. In some implementations, once received by the destination node, a virtual agent on that node may return the addressing scheme to the arbitrary namespace for the cluster. Thus, the virtual agents may be used on the virtual nodes to provide a transparent mechanism to communicate between services that are located on any number of virtual nodes.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a computing environment to deploy application services across virtual nodes, the method comprising:
    initiating configuration processes on the virtual nodes to configure at least a first service on a first set of the virtual nodes and a second service on a second set of the virtual nodes, wherein the first service is dependent on availability of the second service, wherein the first set of the virtual nodes and the second set of the virtual nodes each comprise two or more of the virtual nodes;
    in the first set of the virtual nodes, holding a first configuration process for the first service to prevent execution of the first service until an availability notification is identified for the second service;
    in the second set of the virtual nodes, identifying when the second service is running on the second set of the virtual nodes and, in response to the second service running on the second set of the virtual nodes, communicating the availability notification to at least one virtual agent for the first set of the virtual nodes from a second virtual agent for the second set of the virtual nodes, wherein said communicating the availability notification is performed without requiring a second configuration process for the second service to have knowledge regarding a particular set of virtual nodes of the one or more physical host computing systems on which the first service is deployed by performing an intermediate address translation from a first addressing format used by the second configuration process to a second addressing format;
    in the first set of the virtual nodes, identifying the availability notification at the at least one virtual agent and, in response to identifying the availability notification, executing the first configuration process for the first service to run the first service on the first set of the virtual nodes.

2. The method of claim 1 wherein the virtual nodes comprise containers.

3. The method of claim 1 wherein the virtual nodes comprise virtual machines.

4. The method of claim 1 wherein identifying when the second service is running on the second set of the virtual nodes comprises identifying when the second configuration process for the second service is complete.

5. The method of claim 4 wherein communicating the availability notification to the at least one virtual agent for the first set of the virtual nodes comprises communicating, from the second configuration process, a completion notification to the second virtual agent for the second set of the virtual nodes and, in response to the completion notification, communicating, from the second virtual agent for the second set of the virtual nodes, the availability notification to the at least one virtual agent for the first set of the virtual nodes.

6. The method of claim 5 wherein communicating the completion notification to the second virtual agent for the second set of the virtual nodes comprises communicating the completion notification from the second configuration process to the second virtual agent for the second set of the virtual nodes using the first addressing format, wherein the first addressing format comprises a namespace associated with the virtual nodes, and wherein communicating, from the second virtual agent for the second set of the virtual nodes, the availability notification to the at least one virtual agent for the first set of the virtual nodes comprises:
    translating the first addressing format into a second addressing format, wherein the second addressing format comprises an internet protocol address or a media access control (MAC) address; and
    communicating the availability notification to the at least one virtual agent for the first set of virtual nodes.

7. The method of claim 1 wherein initiating configuration processes on the virtual nodes to configure at least the first service on a first set of the virtual nodes and the second service on the second set of the virtual nodes comprises:
    receiving user input selecting the first service and the second service;
    in response to receiving the user input, deploying the configuration processes to the virtual nodes to configure the first service on the first set of virtual nodes and the second service on the second set of the virtual nodes.

8. The method of claim 7 further comprising identifying dependency information for the first service and the second service and wherein initiating the configuration processes on the virtual nodes comprises providing the configuration processes with the dependency information for the first service and the second service.

9. The method of claim 1 wherein the second service comprises a large-scale processing framework service for clustered data operations, and wherein the first service comprises a monitoring service to monitor operations in the large-scale processing framework service.

10. The method of claim 9 wherein the large-scale processing framework service comprises one of an Apache Spark service or an Apache Hadoop service.

11. A computing architecture with one or more physical host computing systems to deploy application services across virtual nodes on the one or more physical host computing systems, the computing architecture comprising:
a management node configured to initiate configuration processes on the virtual nodes to configure at least a first service on a first set of the virtual nodes and a second service on the second set of the virtual nodes, wherein the first service is dependent on availability of the second service, wherein the first set of the virtual nodes and the second set of the virtual nodes each comprise two or more of the virtual nodes;
the first set of the virtual nodes configured to hold a first configuration process for the first service to prevent execution of the first service until an availability notification is identified for the second service;
the second set of the virtual nodes configured to identify when the second service is running on the second set of the virtual nodes and, in response to the second service running on the second set of the virtual nodes, communicate the availability notification to at least one virtual agent for the first set of the virtual nodes from a second virtual agent for the second set of the virtual nodes, wherein communication of the availability notification is performed without requiring a second configuration process for the second service to have knowledge regarding a particular set of virtual nodes of the one or more physical host computing systems on which the first service is deployed by performing an intermediate address translation from a first addressing format used by the second configuration process to a second addressing format; and
the first set of the virtual nodes configured to identify the availability notification at the at least one virtual agent and, in response to identifying the availability notification, execute the first configuration process for the first service to run the first service on the first set of the virtual nodes.

12. The computing architecture of claim 11 wherein the virtual nodes comprise containers.

13. The computing architecture of claim 11 wherein the virtual nodes comprise virtual machines.

14. The computing architecture of claim 11 wherein the second set of the virtual nodes configured to identify when the second service is running on the second set of the virtual nodes is configured to identify when the second configuration process for the second service is complete.

15. The computing architecture of claim 14 wherein the second set of the virtual nodes configured to communicate the availability notification to the at least one virtual agent for the first set of the virtual nodes is configured to communicate, from the second configuration process, a completion notification to the second virtual agent for the second set of the virtual nodes communicate, from the second virtual agent for the second set of the virtual nodes, the availability notification to the at least one virtual agent for the first set of the virtual nodes.

16. The computer architecture of claim 15 wherein the second set of the virtual nodes configured to communicate the completion notification to the second virtual agent for the second set of the virtual nodes is configured to communicate the completion notification from the second configuration process to the second virtual agent for the second set of the virtual nodes using the first addressing format, wherein the first addressing format comprises a namespace associated with the virtual nodes, and wherein the second set of the virtual nodes configured to communicate, from the second virtual agent for the second set of the virtual nodes, the availability notification to the at least one virtual agent for the first set of the virtual nodes is configured to:
translate the first addressing format into a second addressing format, wherein the second addressing format comprises an internet protocol address or a media access control (MAC) address; and
communicate the availability notification to the at least one virtual agent for the first set of the virtual nodes.

17. The computer architecture of claim 11 wherein the management node configured to initiate configuration processes on the virtual nodes to configure at least the first service on the first set of the virtual nodes and the second service on the second set of the virtual nodes is configured to:
receive user input selecting the first service and the second service;
in response to receiving the user input, deploy the configuration processes to the virtual nodes to configure the first service on the first set of virtual nodes and the second service on the second set of the virtual nodes.

18. The computer architecture of claim 17 wherein the management node is further configured to identify dependency information for the first service and the second service, and wherein the management node configured to initiate the configuration processes on the virtual nodes is configured to provide the configuration processes with the dependency information for the first service and the second service.

19. The computer architecture of claim 11 wherein the second service comprises a large-scale processing framework service for clustered data operations, and wherein the first service comprises a monitoring service to monitor operations in the large-scale processing framework service.

20. The computer architecture of claim 19 wherein the large-scale processing framework service comprises one of an Apache Spark service or an Apache Hadoop service.

* * * * *